E. M. AYER.
MITER BOX.
APPLICATION FILED JULY 24, 1908.
1,006,521.
Patented Oct. 24, 1911.
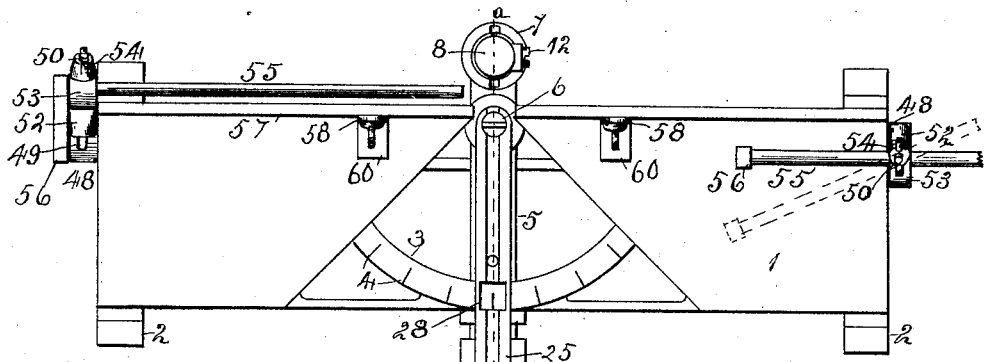
Fig. 1.
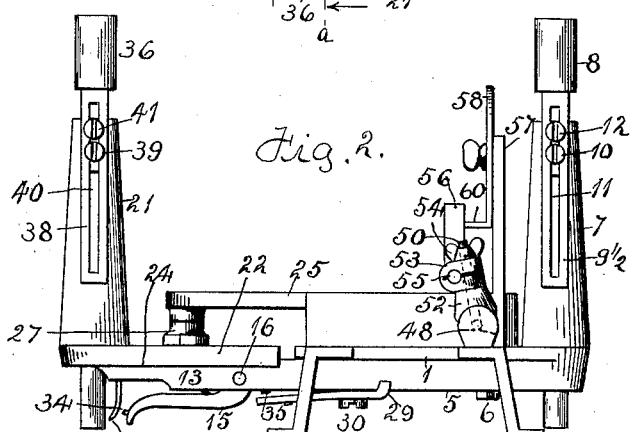
Fig. 5.
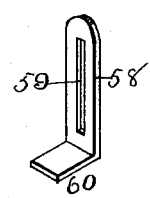
Fig. 6.
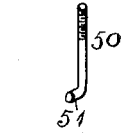
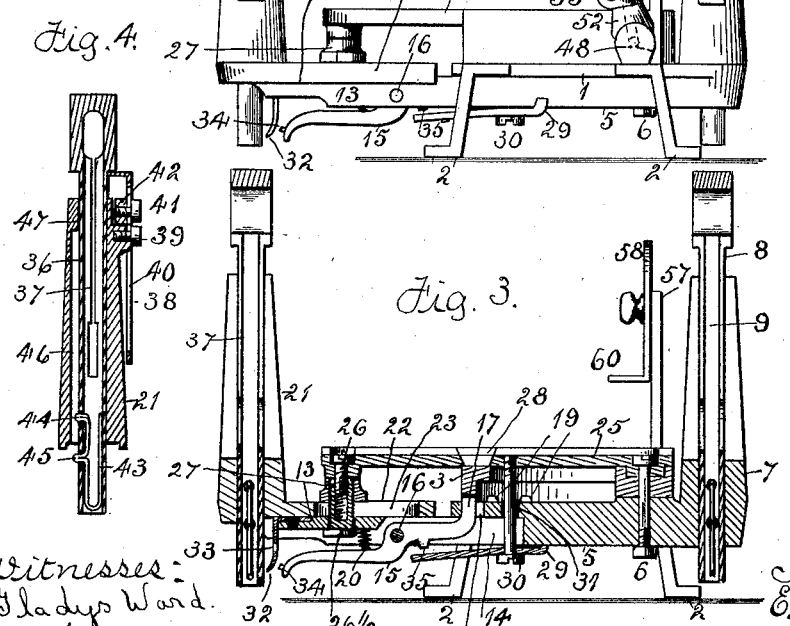
Witnesses:
Gladys Ward.
E. Behel.
Inventor:
E. M. Ayer
By A. O. Behel
Attys.
COLUMBIA PLANOGRAPH CO., WASHINGTON, D. C.

UNITED STATES PATENT OFFICE.

EDWARD M. AYER, OF ROCKFORD, ILLINOIS, ASSIGNOR TO THE H. C. MARSH COMPANY, OF ROCKFORD, ILLINOIS, A CORPORATION OF ILLINOIS.

MITER-BOX.

1,006,521.　　　　　Specification of Letters Patent.　　Patented Oct. 24, 1911.

Application filed July 24, 1908. Serial No. 445,415.

*To all whom it may concern:*

Be it known that I, EDWARD M. AYER, a citizen of the United States, residing at Rockford, in the county of Winnebago and State of Illinois, have invented certain new and useful Improvements in Miter-Boxes, of which the following is a specification.

The object of this invention is to construct a miter box with a number of attachments which are pointed out in the claims.

In the accompanying drawing, Figure 1 is a plan view of my improved miter box. Fig. 2 is an end elevation. Fig. 3 is a vertical transverse section on dotted line $a\ a$ Fig. 1. Fig. 4 is a section on dotted line $b\ b$ Fig. 1. Fig. 5 is an isometrical representation of one of the work gages. Fig. 6 is an isometrical representation of one of the hooks 50.

The base 1 is supported upon feet 2 one located at each corner. The upper face of this base is cut away leaving a segment 3 which is provided with graduations 4.

Beneath the base is located a bar 5 which is pivotally connected with the rear portion of the base by the bolt 6. From the rear portion of the bar 5 extends vertically a saw guide support 7 which is slotted vertically. Within the saw guide support is located a saw guide 8 which has a vertical slot 9 for the passage of a saw. To the saw guide support 7 is adjustably connected a stop 9½ by the screw 10 passing through the slot 11 in the stop.

A block similar to the block 42 is adjustably connected to the stop by the screw 12 which contacts with the upper portion of the saw guide support 7.

The upper end of the stop is turned inward and receives the headed upper end of the saw guide 8, thereby limiting the descent of the saw guide.

The bar 5 has a forward extension 13 which is formed with a lengthwise groove 14. Within this groove 14 is located a latch 15 which is pivotally supported by the pin 16. This latch has an upturned end 17 passing through an opening 18 in the bar 5 and is located to enter the notches 19 in the under face of the segment 3, so as to lock the bar 5 to the segment portion of the base in any of the notches 19 thereof.

A spiral spring 20 serves to hold the latch in engagement with the segment.

The forward extension 13 of the bar 5 supports a saw guide support 21 by the foot portion 22 formed with a length-wise slot 23, and has edges 24 overhanging the edges of the extension which form guides for the foot portion of the guide support.

A clamping bar 25 is located over the segment 3 and has its rear end pivotally connected to the base 1 by the bolt 6. This bolt 6 connects the clamping bar 25 and bar 5 to the base 1 in a pivotal manner. The forward end of the clamping bar 25 is connected to the forward extension 13 of the base, by the screw 26, threaded into a screw 26½. This screw 26 also passes through the slot 23 in the foot portion 22 of the saw guide support 21. A nut 27 is threaded on the screw 26½ and is located in contact with the upper face of the foot portion 22 of the saw guide support 21, and serves to clamp the foot portion 22 in engagement with the forward extension 13 of the base. By means of this nut 27 and the slotted foot portion 22, the saw guide support 21 may be adjusted bodily toward and from the rear saw guide support 7.

An opening 28 is formed through the clamping bar 25 through which the graduations 4 on the segment 3 may be observed.

Beneath the underface of the bar 5 is located a spring arm 29 held in position by the screw 30 which is secured to the clamping bar 25. This screw passes loosely through a hole 31 in the bar.

To the forward extension 13 of the bar 5 is secured a spring catch 32 provided with a perforation 33.

The latch 15 has a downwardly curved end which forms a finger hold, and from the convex surface of this end extends a pin 34.

In order to lock the bar 5 and clamping bar 22 in connection with the segment portion 3 of the base 1, intermediate the notches 19 in the underface of the segment, the latch is moved so that the pin 34 will enter the hole 33 in the spring catch 32. This movement of the latch will cause the projection 35 of the latch to contact with the free end of the spring arm 29, thereby depressing it sufficiently to cause a pressure between the bar 5 and the clamping bar 25 on opposite faces of the segment 3 with sufficient force to hold the bars against movement. By moving the spring catch, the pin 34 is released, and the spring latch is allowed to assume its normal position.

The saw guide support 21 is a duplicate of the rear saw guide support and has a lengthwise slot for the saw. Within the saw guide support 21 is located a saw guide 36 which has a lengthwise slot 37. To the saw guide support 21 is adjustably connected a stop 38 by the screw 39 passing through the slot 40 in the stop. The upper end of this stop is turned inward and receives the upper end of the saw guide 36. A screw 41 secures a nut 42 to the inner face of the stop 38 and is adapted to rest on the upper portion of the saw guide support 21. Within the saw guide 36 is located a spring 43 having two projections 44 and 45 projecting through openings through the wall of the saw guide 36, the projection 44 being longer than the projection 45. The saw guide support 21 is provided with a groove 46 extending nearly its length. These projections 44 and 45 project into the groove 46 and move therein. When the saw guide 36 is raised, the projection 44 will be forced within the saw guide so that it may pass the solid portion 47 at the upper end of the groove. This projection when resting on the upper end of the saw guide support 21 will hold the saw guide 36 and the saw supported thereby elevated in order that material may be placed beneath the saw. The projection 45 coming in contact with the underface of the solid portion 47 at the end of the groove 46 will prevent the withdrawal of the saw guide.

The saw guide support 7 and saw guide 8 are provided with the spring arrangement just described.

At each end of the base 1 is formed an enlargement 48 having a curved upper face, a slot 49 is formed in the curved face and extends to the center of the enlargement when it turns laterally. A screw-threaded hook 50 has its hooked end 51 located in the laterally extending portion of the slot 49. A collar 52 is located over the shank portion of the screw-threaded hook and is fitted to the curved upper face of the enlargement 48. A clamp 53 has an opening through which the shank of the screw-threaded hook passes and receives a nut 54 on its projecting end. This clamp 53 has an opening located at right angles to the shank of the screw-threaded hook 50 and within it is located a rod 55 to one end of which is secured a gage head 56. These gage heads overlie the base 1 when in operative position, and against which the material rests while being cut.

As shown in dotted lines Fig. 1, the gage head can be moved into different positions when the outline of the material requires it. When the gage head is not in use it may be moved so as to lie in rear of the back 57 as shown in solid lines at the left hand end of the box.

At Fig. 5 is shown a gage 58 which is provided with a vertical slot 59. The lower end 60 of this gage extends at right angles to the length of the main section 50. Two of these gages are adjustably connected to the back 57 of the base, and serve to hold the work in position while being cut.

I claim as my invention.

1. In a miter box, the combination with a base, of bars located above and below the base and pivoted to said base, a saw guide mounted on the rear of one bar, a saw guide adjustably mounted on the front end of said bar, and common means for connecting together the front ends of the bars and also securing the adjustable guide against movement and in different positions to said bars.

2. In a miter box, the combination with a base, of spaced elements pivoted to the base, a saw guide carried by the rear portion of the elements, another saw guide having a foot located between the front ends of the elements, and means for clamping the elements upon said foot.

3. In a miter box, the combination with a base having a segmental portion, of a bar pivoted beneath the base and extending beneath the segmental portion, another bar pivoted to the base and extending over the segmental portion, a saw guide carried by the rear end of the first mentioned bar, another saw guide having a foot extending between the front ends of the two bars in front of the segmental portion, a clamping nut interposed between the upper bar and the foot, and means passing through the bars, the foot and the nut for clamping the same together.

4. In a miter box, the combination with a base and swinging saw guiding mechanism pivoted thereto, of a latch pivoted between its ends on the saw guiding mechanism, one end of the latch detachably engaging the base to hold the mechanism in different predetermined positions, the other end constituting actuating means for said latch, and a single device movably mounted between its ends on the saw guiding mechanism, one end of said device frictionally engaging the base to hold the mechanism in different positions, the other end being disposed in the path of movement of the latch and being actuated thereby.

5. In a miter box, the combination with a base, and saw guiding mechanism pivotally mounted thereon, said base being provided with notches, of a latch pivoted on the saw guiding mechanism and engaging the notches, a spring device that frictionally engages the base and has a portion disposed in the path of movement of the latch and engaged by the same when the latch is moved out of the notches, and a catch that engages the latch to hold the same out of the notches and maintain it in engagement with the friction device.

6. In a miter box, the combination with a base having a rear work guide, of saw guiding means adjustably mounted on the base, a supporting device pivotally mounted on the base and capable of swinging between a position in front of the work guide, and a position in rear of the same, a gage adjustably mounted on the supporting device, and means for securing the supporting device against swinging or pivotal movement.

7. In a miter box, the combination with a base having a rear work guide, of guiding means pivoted on the base, a supporting device pivotally mounted on the base and capable of swinging between a position in front of the work guide and a position in rear of the same, a clamp journaled on the supporting device, and a gage longitudinally adjustable in the clamp.

8. In a miter box, the combination with a base having a rear work guide, of saw guiding mechanism pivoted to the base, said base having a projection at one end, a shank pivoted to the projection and capable of swinging to a position in front of the work guide and a position in rear of the same, a collar mounted on the shank, a clamp rotatably mounted on the shank, means threaded on the shank for binding the clamp and collar, and a gage having a stem longitudinally slidable in the clamp.

In testimony whereof I have hereunto set my hand in presence of two subscribing witnesses.

EDWARD M. AYER.

Witnesses:
A. O. BEHEL,
E. D. E. N. BEHEL.

---

Copies of this patent may be obtained for five cents each, by addressing the "Commissioner of Patents, Washington, D. C."